US012679756B2

(12) United States Patent (10) Patent No.: US 12,679,756 B2

Götzendorfer et al. (45) Date of Patent: Jul. 14, 2026

(54) MOLDED BODY MADE OF OPAQUE QUARTZ GLASS AND METHOD FOR PRODUCING SAME

(71) Applicant: Heraeus Quarzglas GmbH & Co. KG, Hanau (DE)

(72) Inventors: Andreas Götzendorfer, Hanau (DE); Gerrit Scheich, Hanau (DE); Nadine Tscholitsch, Hanau (DE); Joerg Hammerschmidt, Hanau (DE); Miriam Sonja Höner, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 504 days.

(21) Appl. No.: 17/846,502

(22) Filed: Jun. 22, 2022

(65) Prior Publication Data

US 2022/0411310 A1 Dec. 29, 2022

(30) Foreign Application Priority Data

Jun. 24, 2021 (EP) ..................................... 21181469

(51) Int. Cl.
C03B 19/06 (2006.01)
C03C 1/04 (2006.01)
(Continued)

(52) U.S. Cl.
CPC .............. C03B 19/066 (2013.01); C03C 1/04 (2013.01); C03C 3/06 (2013.01); C03C 11/00 (2013.01);
(Continued)

(58) Field of Classification Search
None
See application file for complete search history.

(56) References Cited

U.S. PATENT DOCUMENTS 5,674,792 A 10/1997 Moritz et al.
5,736,206 A * 4/1998 Englisch ................. C03B 20/00
65/17.2

(Continued)

FOREIGN PATENT DOCUMENTS

CN 114471845 A * 5/2022
DE 10344189 2/2005
(Continued)

OTHER PUBLICATIONS

JP-2005097103-A EPO Machine Translation Performed Dec. 2024. (Year: 2024).*

(Continued)

*Primary Examiner* — Lisa L Herring
(74) *Attorney, Agent, or Firm* — Dicke, Billig & Czaja, PLLC

(57) ABSTRACT

Producing a molded body made of opaque quartz glass includes providing $SiO_2$ grains obtained by comminuting quartz glass having a purity of at least 99.9 wt % $SiO_2$, forming a slurry containing a suspension liquid and the $SiO_2$ grains and which has a total solids content, wet grinding the $SiO_2$ grains in the slurry so as to form ground $SiO_2$ grain particles, forming a porous green body from the slurry, and sintering the porous green body. To provide a low cost quartz glass, the wet grinding of the $SiO_2$ grains takes place at least temporarily in the presence of $SiO_2$ nanoparticles, the proportion of which in the total solids content of the slurry is in the range of 0.1 wt % to 10 wt %, and the slurry has a solids content in the range of 76 to 80 wt % after addition of the $SiO_2$ nanoparticles and after the wet grinding.

14 Claims, 4 Drawing Sheets

(51) Int. Cl.
    *C03C 3/06*         (2006.01)
    *C03C 11/00*      (2006.01)

(52) U.S. Cl.
    CPC ...... *C03B 2201/02* (2013.01); *C03C 2201/80*
        (2013.01); *C03C 2203/20* (2013.01); *C03C*
                        *2203/52* (2013.01)

(56)            References Cited

U.S. PATENT DOCUMENTS

| | | |
|---|---|---|
| 8,209,998 B2 | 7/2012 | Werdecker et al. |
| 8,920,878 B2 | 12/2014 | Werdecker et al. |
| 9,680,360 B2 | 6/2017 | Schenk et al. |
| 9,725,351 B2 | 8/2017 | Donelon et al. |
| 10,029,938 B2 | 7/2018 | Hofmann et al. |
| 10,358,373 B2 | 7/2019 | Schenk et al. |
| 10,384,324 B2 | 8/2019 | Shafrir |
| 11,485,669 B2 | 11/2022 | Schenk et al. |

| | | | | |
|---|---|---|---|---|
| 2016/0090319 A1* | 3/2016 | Hofmann | ............... | C03C 12/00 |
| | | | | 65/17.6 |
| 2016/0280577 A1* | 9/2016 | Donelon | .............. | C03B 23/047 |
| 2017/0341968 A1* | 11/2017 | Schenk | ................. | C03B 19/066 |
| 2018/0001434 A1* | 1/2018 | Shafrir | ................... | C03B 17/02 |
| 2018/0179098 A1* | 6/2018 | Schenk | ................... | C03C 3/06 |
| 2019/0031555 A1* | 1/2019 | Scheich | ................. | C03C 11/00 |
| 2019/0062193 A1* | 2/2019 | Otter | ....................... | C03B 20/00 |

FOREIGN PATENT DOCUMENTS

| | | | | |
|---|---|---|---|---|
| EP | 1516864 | 3/2005 | | |
| JP | 2005097103 A | * 4/2005 | ............ | C03B 19/06 |

OTHER PUBLICATIONS

CN114471845A Google Machine Translation retrieved Dec. 9, 2024. (Year: 2024).*

* cited by examiner

MOLDED BODY MADE OF OPAQUE QUARTZ GLASS AND METHOD FOR PRODUCING SAME

CROSS-REFERENCED TO RELATED APPLICATION

This Utility Patent Application claims priority to European Application No. 21 181 469.4 filed on Jun. 24, 2021, which is incorporated herein by reference.

TECHNICAL FIELD

One aspect relates to a molded body made of opaque quartz glass containing pores with a closed porosity, a chemical purity of at least 99.9 wt % of $SiO_2$, a density in the range of 2.14 to 2.19 $g/cm^3$.

Furthermore, one aspect relates to a method for producing a molded body made of opaque quartz glass, including:
- (a) providing $SiO_2$ grains obtained by comminuting quartz glass having a purity of at least 99.9 wt % $SiO_2$,
- (b) forming a slurry which contains a suspension liquid and the $SiO_2$ grains and which has a total solids content,
- (c) wet grinding the $SiO_2$ grains in the slurry so as to form ground $SiO_2$ grain particles,
- (d) forming a porous green body from the slurry, and
- (e) sintering the porous green body so as to form the molded body, Such molded bodies made of opaque quartz glass are used, for example, for producing quartz glass components in chemical process engineering or in semiconductor manufacturing for processing wafers and for optimizing heat management in process chambers. The quartz glass components are, for example, simple quartz glass components such as pipes, rods, plates, flanges, rings or blocks. Alternatively, they are complex components, for example reactors or apparatuses such as carrier racks, bell jars, crucibles, protective screens, process tubes and the like. The further processing of the molded body to give the component made of opaque quartz glass can include mechanical machining, such as cutting, milling, grinding, polishing, and/or hot working, such as welding, reshaping, fire polishing.

BACKGROUND

To produce molded bodies of this type from opaque quartz glass, methods are known in which quartz glass grains are first produced by comminuting transparent quartz glass, and these are processed further in a liquid to give a slurry. Hereinafter, the names slip, suspension or dispersion are also used interchangeably for "slurry".

Thus, for example, DE 43 38 807 C1 (equivalent publication: U.S. Pat. No. 5,674,792 A) describes a molded body made of opaque, closed-pore quartz glass. The quartz glass is characterized by a chemical purity of at least 99.9 wt % $SiO_2$, a hydroxyl group content of 30 to 600 ppm by weight, and a density in the range of at least 2.15 $g/cm^3$. At least 80% of the pores have a pore size of less than 20 μm. To produce the molded body, naturally occurring crystalline quartz raw material is purified, melted by electromelting to give quartz glass, and the quartz glass is subsequently ground to give fine $SiO_2$ grains with a purity of more than 99.9 wt % of $SiO_2$. The ground $SiO_2$ grains are further comminuted in deionized water using grinding balls by wet grinding to give "ground $SiO_2$ grain particles". After the wet grinding, the particle size of ground $SiO_2$ grain particles is in the range between 0.45 μm and 50 μm, wherein approximately 60% of the $SiO_2$ particles have a size in the range of 1 to 10 μm. The slurry thus produced has a solids content of approximately 78% and is poured into a gypsum mold, dried to form a green body, and the green body is compacted by a sintering treatment in the temperature interval between 1350° C. to 1450° C. to form the closed-pore molded body made of opaque quartz glass having a hydroxyl group content of between 100 and 500 ppm by weight.

The molded body produced in this way from opaque quartz glass exhibits low spectral transmission in the wavelength range from 190 to 2650 nm and with an irradiated layer thickness of 1 mm at a virtually constant level of below 10%. It is therefore suitable for producing components in which thermal insulation or heat dissipation at high temperatures is important. Furthermore, the opaque quartz glass exhibits the properties which are also otherwise characteristic and advantageous for quartz glass, such as a low coefficient of thermal expansion, high temperature stability and good chemical resistance to many process media.

DE 44 40 104 A1 (equivalent publication: U.S. Pat. No. 5,736,206 A) describes a development of the molded body from DE 43 38 807 C1. This molded body has a transparent surface region which is produced by local heating of the surface, for example with the aid of a heating burner, a plasma torch or a $CO_2$ laser.

EP 3 205 630 A1 proposes, for producing a diffuser material made of opaque quartz glass with particularly high purity requirements, to use synthetically produced transparent quartz glass grains having a hydroxyl group content of at least 200 ppm by weight as the starting material instead of naturally occurring quartz glass grains. The starting material is comminuted and the comminuted grains are further wet milled in a slurry so that particle sizes of on average less than 10 μm are obtained. The slurry is poured into a mold and formed into a green body which, after drying at a temperature below 1400° C., is sintered to form a molded body from the diffuser material having a density of 2.145 $g/cm^3$. Its purity is more than 99.99% $SiO_2$ taking into account the impurities of Li, Na, K, Mg, Ca, Fe, Cu, Cr, Mn, Ti, Al, Zr, Ni, Mo and W of 0.4 ppm by weight.

EP 1 516 864 A2 (equivalent publications: DE 103 44 189 A; JP 2005097103 A) describes a method for producing a cast part made of a vitreous composite material by casting a highly filled slip having a solids content of at least 80 wt %. A homogeneous base slip is first produced by grinding high-purity synthetic amorphous quartz glass in deionized water. The base slip can contain up to 5 wt % of $SiO_2$ nanoparticles. A composite slip is produced from the base slip by mixing in additional quartz glass grains having particle sizes above 10 μm. The composite slip is further homogenized and then poured into a water-impermeable mold. A frozen blue body is formed, which is subsequently dried and sintered. In addition, a pipe made of opaque vitreous composite material is described which has a homogeneous matrix of quartz glass in which grains of quartz glass having a grain size of more than 10 μm are embedded. The average density of the composite material is, for example, 2.15 $g/cm^3$.

In the method known from EP 1 516 864 A2, the highly filled slip is solidified in the volume and not starting from the surface by contact with a liquid-absorbing mold. The high solids content stabilizes the slip and counteracts rapid sedimentation. However, freeze-drying the blue body is a lengthy, energy-intensive and poorly reproducible process. This is because, when the liquid is not removed quickly enough during thawing, the green body can run off. This is particularly problematic in the case of thick-walled green bodies. Moreover, highly filled slips with solids contents of more than 80% exhibit unfavorable flow behavior with high viscosity at low and high shear rates. Therefore, on the one hand, casting structures (visual inhomogeneities) can easily form during filling of the mold. On the other hand, enclosed bubbles can no longer escape and lead to cavities in the sintered molded body.

Opaque quartz glass is also suitable for forming coatings. Slip-based production methods for this purpose are described in EP 2 069 244 B1 (equivalent application: U.S. Pat. No. 8,209,998 B2) and EP 2 878 584 A1 (equivalent application: U.S. Pat. No. 9,680,360 B2). In order to adjust the flow properties of the slip or to optimize the coating function, $SiO_2$ nanoparticles are added to the slip.

For these and other reasons there is a need for the present invention.

SUMMARY

In principle, productivity increases in semiconductor manufacture are accompanied by an increase in the requirements on the material quality of the components used in the process, such as tool components and equipment, in particular requirements regarding the chemical purity thereof. With progressive miniaturization of the semiconductor structures, the spotlight is also shone on other material properties which are a prerequisite for large-area homogeneous processing of the semiconductor components, such as a high and uniform reflectivity of the components used. The hitherto known molded bodies or components made of opaque quartz glass do not sufficiently meet these requirements.

One embodiment is therefore based on the object of providing a molded body which is made of opaque quartz glass and from which high-quality components for semiconductor manufacture, in particular those having a homogeneous reflectance, can be produced.

One embodiment is also based on the object of specifying a method for the cost-effective and reproducible production of such a molded body made of opaque quartz glass.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The embodiments are explained in more detail below using exemplary embodiments and a drawing. In detail.

DETAILED DESCRIPTION

Figure 1:
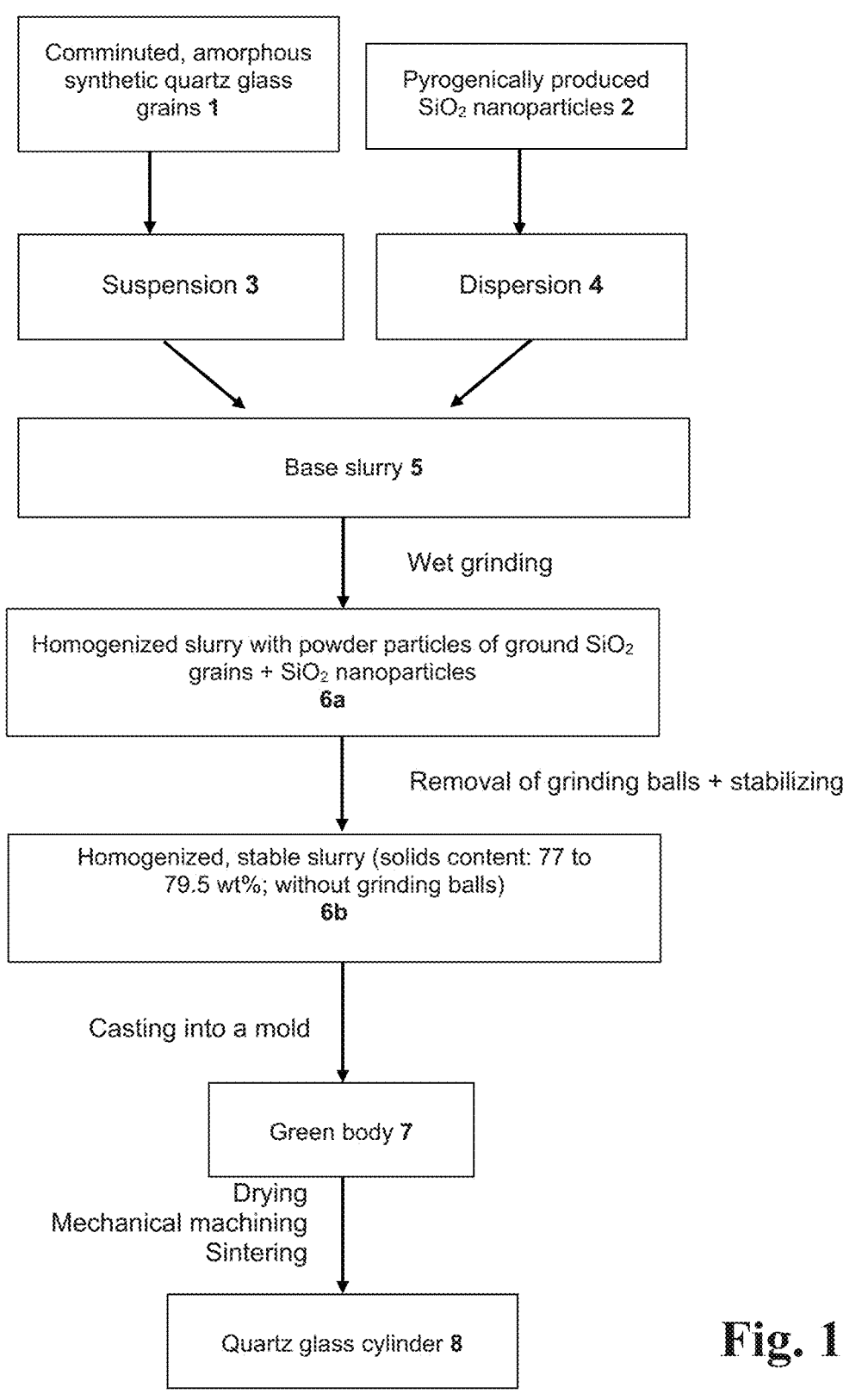
FIG. 1 is a flow chart explaining the production of an embodiment of the molded body according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

With regard to the method, this object is achieved according to one embodiment starting from a method of the type mentioned at the outset in that the wet grinding of the $SiO_2$ grains according to method step (c) takes place at least temporarily in the presence of $SiO_2$ nanoparticles, the proportion of which in the total solids content of the slurry is in the range of 0.1 wt % to 10 wt %, and in that the slurry has a solids content in the range of 76 to 80 wt % after addition of the $SiO_2$ nanoparticles and after the wet grinding.

A prerequisite for a homogeneous reflectance of the molded body is a homogeneous density and solids distribution. In the case of slip casting methods, as here, density differences can arise during the molding of the green body from the slurry by sedimentation and/or separation (segregation). This is particularly the case when the slurry contains a mixture of different mobile solid particles, which can lead to an enrichment in specific particle types and particle size fractions in different volume areas of the green body. When molding the green body from the slurry, gravity and the direction of the liquid absorption (dewatering direction) are decisive influencing variables for the formation of characteristic, different volume areas. In the suspension liquid, solid particles sink to the bottom under the influence of gravity. The sedimentation rate is proportional to the square of the particle size (at least for low sedimentation rates). This results in particle size segregation. In addition, different sizes of particles pack together to different extents. In this way, sedimentation leads to density differences from top to bottom. One embodiment aims to reduce the effect of these, and other, influencing variables which can lead to an inhomogeneous density and solids distribution in the green body.

A solid component of the slurry necessary for the method is $SiO_2$ grains (hereinafter also referred to as "quartz glass grains") which are obtained by comminuting quartz glass. A further solid component of the slurry necessary for the method is $SiO_2$ nanoparticles. These are, for example, produced from silicon compounds which are converted to $SiO_2$ by polymerization, polycondensation, oxidation, pyrolysis, precipitation. In the process, fine dust particles of synthetic $SiO_2$ with sizes of less than 1 μm, in one embodiment, less than 500 nm, precipitate out as intermediate products, end products or by-products; these are referred to here as "$SiO_2$ nanoparticles".

During the wet grinding, the quartz glass grains are further comminuted. The intensity of the comminution process can be strengthened by adding grinding media, which consist of synthetically produced quartz glass. In the method according to one embodiment, the wet grinding takes place at least temporarily, or over the entire grinding duration, in a slurry which contains $SiO_2$ nanoparticles in addition to the quartz glass grains.

The particle sizes of the $SiO_2$ nanoparticles are typically in the range of approximately 100+/−50 nm. They have a large surface area and cause contact points in the green body and facilitate the hard sintering of the molded body. For this reason, $SiO_2$ nanoparticles are commonly added to the slurry, specifically after completion of the wet grinding process; this is sometimes also referred to as "powdering". In contrast, it has been found that the presence of $SiO_2$ nanoparticles has a favorable effect on some properties of the molded body obtained as the process product, even during wet grinding of the quartz glass grains. In particular, a particularly homogeneous density distribution within the molded body volume is observed, also referred to hereinafter as "homogeneity". Without being bound to this explanation, this is attributed to the fact that, as a result of the wet grinding process on the quartz glass grains, new fracture surfaces are continuously being produced which form fresh and comparatively reactive surfaces with which the $SiO_2$ nanoparticles can interact. This interaction can lead to the formation of weak bonds due to intermolecular forces and hinder the mobility of both the $SiO_2$ nanoparticles and the ground $SiO_2$ grain particles, so that, even with a comparatively low solids content of less than 80 wt %, in one embodiment of less than 79.5 wt %, the solids distribution within the volume of the slurry is stabilized. In this way, for example, sedimentation or segregation of different solid components can be counteracted, in particular if the molding of the porous green body includes casting the slurry into a liquid-absorbing mold.

The molded body produced in this way exhibits a measurably more homogeneous density distribution than would be achievable without the addition of $SiO_2$ nanoparticles in the wet grinding process. Visually discernible inhomogeneities in the volume of the sintered molded body, such as translucent regions which have been observed without the addition of $SiO_2$ nanoparticles or with delayed addition of $SiO_2$ nanoparticles after the wet grinding process, are not observed. The molded body has a visually homogeneous appearance.

The degree of interaction depends on the concentration of the $SiO_2$ nanoparticles in the slurry. To achieve a noteworthy effect with regard to homogeneity, the proportion of the $SiO_2$ nanoparticles in the total solids content of the slurry is in the range from 0.1 wt % and 10 wt %, in one embodiment in the range of 1 wt % to 2 wt %, and in one embodiment is at most 5 wt %. At very high proportions of the $SiO_2$ nanoparticles of more than 10 wt %, the viscosity of the slurry increases, making casting more difficult. In addition, this results in a lower density of the green bodies, making hard sintering more difficult.

The degree of interaction also depends on the duration of the wet grinding process in the presence of the $SiO_2$ nanoparticles. This substantially involves comminution processes. In view of this, it has proven effective if the wet grinding of the $SiO_2$ grains according to method step (c) in the presence of $SiO_2$ nanoparticles is at least 1 h, in one embodiment at least 10 h and in one embodiment at least 120 h. A wet grinding process with a duration of more than 240 h leads to a comparatively low further gain in homogeneity, although particularly high homogeneity requirements may justify the long process duration.

The total solids content of the slurry results at the end of the wet grinding process. It is set, from the start, to a target value or it is set to the target value starting from an initial solids content by adding further solid in the course of the wet grinding process. Due to abrasion of any grinding media, certain deviations from the target value can result. The initial solids content includes the quartz glass grains and it may also include at least part of the $SiO_2$ nanoparticles. The formation of the slurry according to method step (b) includes bringing the suspension liquid together with the initial solids content/the total solids content, which can be taken up in a separate dispersion liquid. The start of the wet grinding process is the time at which the slurry—with or without additional grinding media—is moved, by stirring, by rotating, by applying ultrasound, or in some other way, intensively enough that the quartz glass grains are comminuted.

The solids content of the slurry at the end of the wet grinding process and during the molding of the porous green body is set to the range from 76 wt % to 80 wt %, in one embodiment to the range from 77 wt % to 79.5 wt %. This enables the particularly cost-effective production of the molded body by introducing, for example by pouring, the slurry into a mold, which absorbs a part of the suspension liquid. This procedure could otherwise, at a solids content of less than 76 wt % or less than 77 wt %, bring about a rapid sedimentation and thus particle size segregation and hence an inhomogeneous green body and molded body and, at a solids content of more than 80 wt % or more than 89.5 wt %, this procedure could impede the homogenization of the slurry and produce casting structures in the molded body.

The slurry contains the $SiO_2$ nanoparticles from the outset, or the $SiO_2$ nanoparticles are added to the slurry before the start of the wet grinding process or during wet grinding. The addition advantageously takes place by adding to a dispersion, by using which at least a portion of the $SiO_2$ nanoparticles of the slurry are added in colloidal form with a specific surface area (BET) of at least 20 $m^2/g$.

Adding the $SiO_2$ nanoparticles to a dispersion simplifies handling thereof. The homogenization is carried out by moving the slurry or the dispersion with the aim of a more uniform distribution of the solids contained therein.

In a one method variant, the slurry is cooled, after the wet grinding, under movement, for at least 1 h, in one embodiment at least 10 h, in one embodiment at least 30 h, under continuous movement.

Some of the kinetic energy used in the grinding process is converted into heat. This results in the slurry heating up during the wet grinding process. After completion of the wet grinding process, the temperature of the slurry is typically in the range from 30 to 60° C. It has been found that the molding of the green body from the heated slurry can lead to inhomogeneities in the green body and in the molded body. Therefore, in this preferred method variant, a gradual cooling of the slurry without grinding media and with sustained movement is provided. The gradual cooling of the slurry is, for example, a controlled, regulated, or in one embodiment free cooling to ambient temperature, for example to room temperature.

It has proven advantageous if, after the wet grinding, the slurry has $SiO_2$ particles having a particle size distribution which is defined by a $D_{90}$ of less than 50 μm and a $D_{50}$ value of less than 15 μm In this case, the wet grinding takes place, in one embodiment in a drum mill lined with plastic and using grinding media made of synthetic quartz glass, until a particle size distribution with a $D_{90}$ value of less than 50 μm is achieved. This particle size distribution relates to the ground $SiO_2$ grain particles produced by wet grinding. The $SiO_2$ nanoparticles have a particle size distribution outside the particle size range detectable by the measurement method.

It has proven particularly beneficial if, after completion of the wet grinding process, the slurry has a pH in the range of 3 to 5 and a solids content in the range of 77 to 79.5 wt %. The above-mentioned pH ranges and solids content ranges characterize the respective values at the end of the wet grinding process.

Depending on the height dimensions and the volume of the molded body to be produced, the molding times (casting times) can be in the range of several hours to days. In view of this, it is advantageous in one embodiment if the slurry has a sedimentation behavior which is characterized in that a column of the slurry having a height of 145 mm has formed a sediment with a sediment height of less than 20 mm after a standing time of 24 h. It can be determined whether the slurry has this property using an experiment as described under "definitions and measurement methods". The $SiO_2$ grains are in one embodiment obtained by comminuting synthetically produced transparent quartz glass, wherein the comminuting includes electrodynamic and/or electrohydraulic fragmentation of the quartz glass.

In electrodynamic fragmentation, ultrashort high-voltage pulses are applied to the $SiO_2$ grains in a liquid, such as in water. In the case of a voltage rise time of less than 500 ns, the high-voltage pulses in one embodiment penetrate through the solid particles. The reason for this is the higher dielectric strength of the liquid (water) with respect to solid breakdowns when the voltage rise time is short. In contrast, the spark discharge takes place during electrohydraulic fragmentation by the liquid carrier medium (for example water). In both cases, the electrical breakdown leads to pressure fluctuations (shock waves), which ensures a largely contamination-free comminution of the quartz glass grains.

The green body is in one embodiment obtained by pouring the slurry into a mold. However, other processing methods for the slurry are also suitable, such as suction into a mold, dipping, spraying, painting, thin-coating, removal, application, doctor blade coating and the like.

In a preferred procedure, the green body is dried before sintering, the drying in one embodiment taking place at an elevated temperature and including a drying duration of at least 24 h. For economic reasons, the drying duration is as short as possible. In practice, the drying can take several days, for example 7 days or less, depending on the molded body or drying temperature. The drying temperature in one embodiment advantageously does not exceed 120° C. in order to avoid an abrupt escape of water vapor.

It has furthermore proven favorable if a surface area of the green body is removed before sintering by mechanical machining, in particular by sanding, wherein a machining tool is in one embodiment used that has machining surfaces made of plastic-bonded grains.

The green body generally already has a shape that comes close to the final contour of the molded body to be produced. This is, for example, a solid full body or a hollow body. The machining produces a shape close to the final contour or effects smoothing or structuring of the surface. In addition, a surface area which may have impurities is removed. These impurities have for example formed on the surface through previous process steps and can lead to undesired surface devitrification during the subsequent sintering step.

Compared to a metallic or ceramic binder, the abrasion of the plastic binding of the cutting, grinding or polishing agent can be burnt out and therefore does not lead to a significant introduction of impurities into the green body.

When comminuting the quartz glass grains according to method step (a), as is also the case with the wet grinding in method step (b), fracture surfaces and fragments are produced, which generally do not have a spherical, but rather a non-spherical, fissured, splintered morphology. In the green body, these $SiO_2$ particles intermesh with one another. This increases the strength, reduces the tendency to break, and thus facilitates the handling of the green body.

The green body is dried and sintered to form a gas-tight, mechanically stable molded body. The intensity of the sintering process is to be selected such that, as far as possible, sintering is achieved up to the closed porosity of the molded body. The parameters suitable for sintering (sintering temperature, sintering time, atmosphere) are to be determined on the basis of simple experiments.

In one embodiment, the sintering according to method step (d) takes place at a sintering temperature in the range between 1325° C. and 1600° C., in particular at a sintering temperature of less than 1500° C. and better still of less than 1450° C., in one embodiment under air.

With regard to the molded body made of opaque quartz glass, the above-mentioned technical object is achieved according to one embodiment proceeding from a molded body having the features mentioned at the outset in that the quartz glass has a homogeneity defined by the fact that the molded body has a first volume area with a maximum density and a second volume area with a minimum density, wherein the difference in density between the maximum density and the minimum density is less than 0.025 $g/cm^3$.

It is obvious that the molded body volume ideally does not have any density difference at all. In practice, however, differences between a maximum density and a minimum density are present within the scope of measurement accuracy. These density differences arise when the green body is formed from a slurry of mixtures of different mobile solid particles as a result of gravity, sedimentation and/or demixing (segregation), as explained in more detail above with reference to the method according to in one embodiment.

A density difference between the maximum density and the minimum density of less than 0.026 $g/cm^3$, in one embodiment less than 0.018 $g/cm^3$, is reflected by a visually uniform opaque appearance without translucent or transparent volume areas, for example at molded body edges. The molded body according to one embodiment is produced by using the above-described slip casting method using a casting mold with liquid-absorbing walls. It in one embodiment consists of synthetically produced quartz glass. Synthetic quartz glass is characterized by high purity. The synthetic quartz glass is produced using a synthetically produced silicon-containing starting material. It is highly pure in the sense that the main component is $SiO_2$ and undesired impurities are present at most in the sub-ppm range. The opaque quartz glass in one embodiment has a total impurity content of Li, Na, K, Mg, Ca, Fe, Cu, Cr, Mn, Ti, Al, Zr, Ni, Mo and W of not more than 0.5 ppm by weight. The opacity of the molded body is determined by the number, size and shape of the pores. These act as optical interference points in the quartz glass matrix and cause the molded body to appear opaque-translucent or opaque, depending on the layer thickness. The pores are as small as possible and distributed uniformly in the quartz glass molded body. At least 80% of the pores have a pore size of less than 20 μm, in one embodiment less than 15 μm and in one embodiment less than 10 μm. The stated pore proportion of 80% relates only to pores having a pore size of more than 1 μm.

The molded body is gas-tight and therefore does not have open porosity. It is also suitable for applications where high thermal and chemical stability and high resistance to corrosive gases and liquids are important. Open porosity of a workpiece is reflected by it being absorbent, which is detectable on the basis of a dye penetration test. A molded body having a porosity of less than 3% is referred to here as "gas-tight", which can also be detected by a lack of absorbency in the dye penetration test. The porosity of the molded body is generally in the range between 0.5 and 3 wt %.

The molded body can be used as a diffusely reflecting component in a heating device. The high homogeneity of the molded body also contributes to a more uniform reflectivity, in particular in the infrared wavelength range. This in turn makes it possible to reduce heat losses and save on heating energy and allows the thermal conditions in the heating device to be optimized. For example, usable furnace regions can be increased and process fluctuations can be reduced.

The molded body typically has one or more or all of the following properties:

a viscosity at 1350° C. in the range of $4 \times 10^{10}$ to $7 \times 10^{10}$ dPa·s a modulus of elasticity of at least 68 GPa, a shear modulus of at least 29 GPa, flexural strength of at least 100 MPa, dielectric strength of at least 30 kV/mm, a specific electrical resistance of at least $10^{16}$ Ωm, relative permittivity of at most 3.8.

Definitions and Measurement Methods

Individual terms of the above description are defined below. The definitions form part of the description of the invention. In the event of a conflict between one of the following definitions and the remaining description, the statements made in the rest of the description prevail.

If a measurement method is not specified for a parameter, the standard measurement method is to be used for this parameter, and in particular that measurement method which is laid down in the corresponding ISO specification with the publication date closest to that of the present application. Should measurement conditions not be specified, then the following apply as standard conditions (SATP conditions) for temperature: 298.15 K (25° C., 77° F.) and for absolute pressure: 100 kPa (14.504 psi, 0.986 atm).

Opaque Quartz Glass

Opaque quartz glass contains small bubbles that cause light scattering and give the glass a translucent to whitish appearance. There are fluid transitions between opacity and translucency. Translucency refers to the partial light transmission that is less based on optical absorption than it is on light scattering. Opacity is the reciprocal property of translucency. In this respect, the opacity is a measure of the light impermeability of the quartz glass.

Synthetically Produced Quartz Glass

Synthetic transparent quartz glass is obtained, for example, by flame hydrolysis or oxidation of synthetically produced silicon compounds, by polycondensation of organic silicon compounds according to the so-called sol-gel method, or by hydrolysis and precipitation of inorganic silicon compounds in a liquid. In the industrial production of synthetic quartz glass, $SiO_2$-rich primary particles also precipitate out as what is referred to as soot dust or filter dust. After pre-compaction by granulation, these dusts can likewise be sintered or melted to give synthetic transparent quartz glass.

Slurry

The term "slurry" is used to denote a suspension or dispersion of a liquid and $SiO_2$ solid particles. The liquid used may be water which is purified by distillation or deionization in order to minimize the content of impurities. Instead of slurry, the term "slip" is also common.

Particle Size and Particle Size Distribution

Particle size and particle size distribution are characterized using the $D_{10}$ or $D_{50}$ or $D_{90}$ values. These values are taken from particle size distribution curves illustrating the cumulative volume of $SiO_2$ particles as a function of the particle size. In this case, the $D_{10}$ value characterizes the particle size that is not achieved by 10% of the cumulative volume of the $SiO_2$ particles, and, accordingly, the $D_{90}$ value characterizes the particle sizes that are not achieved by 90% of the cumulative volume of the $SiO_2$ particles. The particle size distribution is determined using a "Mastersizer 3000" particle analyzer from Malvern Panalytical GmbH by scattered light and laser diffraction spectroscopy according to ISO 13320.

Measuring the Sedimentation Behavior

Enough slurry is added to a measuring cylinder until it results in a column height of 145 mm. After predetermined time intervals, the height of the supernatant (above the sediment) is measured. The height of the sediment is determined from this. The measuring cylinder is not moved in the process.

Measuring the Maximum Density Difference

Since the molded body according to one embodiment does not have an open porosity, a simple density measurement of measurement samples according to the Archimedean principle is possible.

The density distribution is determined by taking at least three uniformly distributed density measurement samples at a measuring distance of 1 cm and having a sample volume of approximately 1 cm³ over the height of a cylindrical sample body. The density measurement samples include the volume area arranged at the bottom during the molding (casting) of the green body and the volume area arranged at the top during the molding of the green body along the cylinder longitudinal axis of the sample body. A sample body with a height of 5 cm enables, for example, three density measurement samples with a center-to-center distance of 1.5 cm each and a distance from the end surfaces of 0.5 cm each.

The maximum value and the minimum value of the density are determined from the density measurement samples.

Pore Size/Pore Volume (Porosity)/Pore Size Distribution

The pore size is the maximum distance between two opposite pore walls of a pore. The "pore volume" of a porous material denotes the free volume occupied by cavities within the material. The pore volume is determined on the basis of a density measurement.

The porosity is determined on the basis of the density measurement, taking into account the specific density of transparent quartz glass; it is approximately 2.2 g/cm³.

The pore size distribution denotes the frequency of the measured pore diameter. The pore size is determined using scanning electron micrographs of polished sample sections.

In the case of round pores, it is indicated as the measured diameter and, in the case of non-round pores, as the mean diameter, which is calculated from the inner circle area of an ellipse which is as large as possible and which surrounds exclusively pore surfaces and the ellipse diameter perpendicular thereto at the same center point.

Sintering

"Sintering" denotes a method step in which the molded body is treated at an elevated temperature of more than 1100° C. and in the process is thermally compacted. Sintering is carried out under air, under inert gas or under vacuum. Vacuum is understood to mean an absolute gas pressure of less than 2 mbar.

Based on FIG. 1, the method according to one embodiment is explained below using the example of the production of a plate-shaped molded body made of opaque quartz glass for use in a heating device for semiconductor manufacture.

Comminuted Quartz Glass Grains 1

As is customary, a cylinder of transparent synthetic quartz glass is produced by flame hydrolysis of a silicon-containing starting material. The quartz glass cylinder is sawed into segments, and these are comminuted by electrodynamic or electrohydraulic fragmentation to form $SiO_2$ grains 1. These grains made of synthetically produced $SiO_2$ represent one of the starting materials of the slurry.

Pyrogenically Produced $SiO_2$ Nanoparticles 2

The pyrogenically produced $SiO_2$ nanoparticles 2 used here are commercially available under the name "ZANDO-SIL" in the form of a white, loose powder. The powder has a BET surface area of approximately 30 $m^2$/g and a bulk density of approximately 200 g/l. The $SiO_2$ nanoparticles 2 are present in the form of aggregates or agglomerates of $SiO_2$ primary particles and typically have a broad particle size distribution in the range from approximately 5 nm to approximately 200 nm, frequently around 100+/−50 nm. The $SiO_2$ nanoparticles readily adhere to one another and form larger clusters, making it difficult to measure the individual particle sizes. The particle size is to be determined microscopically, in a simple and comparatively accurate manner.

Suspension 3

For a batch of 10 kg of slurry 1 ($SiO_2$ water slurry), 8.2 kg of the amorphous synthetic quartz glass grains 1 are mixed with 1.8 kg of deionized water 3 having a conductivity of less than 1 µS in a drum mill lined with polyurethane and having a volume capacity of approximately 20 liters.

Dispersion 4

The $SiO_2$ nanoparticles 2 are taken up in colloidal form in a weight ratio of 50:50 in deionized water having a conductivity of less than 1 µS, and this dispersion 4 is dispersed by being homogenized using a stirrer and being stored in a rolling manner until use.

Base Slurry 5

The suspension 3 and the dispersion 4 are combined to form a base slurry 5. In this case, the proportion of dispersion 4 is adjusted such that the $SiO_2$ nanoparticles added make up 1%, 2%, 5% or 10% of the solids content of the base slurry 5. Until that point, the solids content consists of the amorphous, synthetic quartz glass grains and the $SiO_2$ nanoparticles and, at the end of the wet grinding process, is in the range from 76 wt % to 80 wt %, in one embodiment in the range from 77 wt % to 79.5 wt %. In this case, it is taken into account that, in the course of the wet grinding process, the solids content is slightly increased by the grinding media abrasion. Grinding media made of synthetic quartz glass are added to the base slurry 5, and it is ground on a roller block at 20 rpm. In the course of wet grinding, the pH decreases to approximately 4. At the same time, the quartz glass grains 1 are further comminuted, so that new fracture surfaces are produced continuously and form fresh and comparatively reactive surfaces. The $SiO_2$ nanoparticles 2 can interact therewith, which can reduce the mobility of both the $SiO_2$ nanoparticles and the ground $SiO_2$ grain particles. As a result, the solids distribution within the volume of the slurry can be stabilized and the segregation of the different solid components can be reduced.

Figure 6:
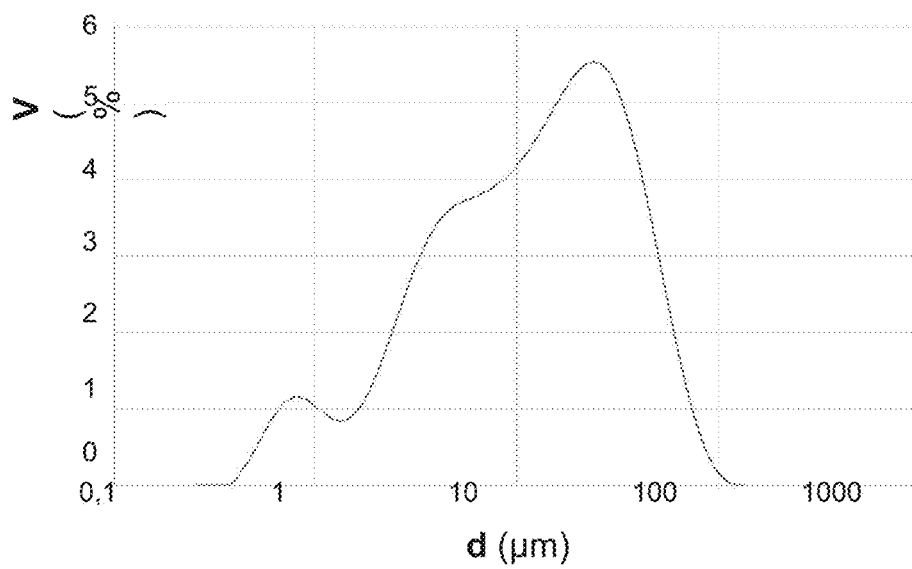
FIG. 6 is a diagram illustrating the distribution of the particle sizes in a slurry after completion of the wet grinding process.

During wet grinding, the former quartz glass grains 1 are ground to give fine $SiO_2$ powder particles. The wet grinding process lasts until a particle size distribution is established in which the particle size distribution of the powder particles has reached a $D_{90}$ value of less than 50 µm. In one exemplary embodiment, after a wet grinding duration of 11 days, a particle size distribution having a $D_{90}$ value of 42.5 µm, a $D_{50}$ value of 12.7 µm and a $D_{10}$ value of 2.18 µm resulted. The diagram of FIG. 6 illustrates the corresponding particle size distribution. In this case, the proportional particle volume V (in %) is plotted on the y-axis, and the particle size d (in µm) is plotted on the x-axis. The fine fractions with particle sizes of less than 1 µm cannot be resolved with the selected measurement method, i.e. also not the $SiO_2$ nanoparticles. However, more accurate results arise from the larger particles, which determine the termination of the wet grinding process.

Stabilization of the Slurry 6a

The result of the wet grinding process is a homogenized slurry 6a of water, ground $SiO_2$ grains and $SiO_2$ nanoparticles, which moreover contains a low, undetermined fraction of $SiO_2$ from the abrasion of the quartz glass grinding media.

After the wet grinding process, the homogenized slurry 6a has a temperature of around 40° C. and is characterized by a homogeneous solids distribution. The grinding media are removed and the slurry 6a is brought to ambient temperature by free cooling under movement by storing on a roller block. The cooling of the slurry 6a to ambient temperature (25° C.) under rotation takes several hours, for example 30 h to 200 h; in the exemplary embodiment, it is 48 h. This procedure brings about a stabilization of the previously produced homogeneous solids distribution. A homogenized stable slurry 6b of the suspension liquid, ground $SiO_2$ powder particles, $SiO_2$ nanoparticles and a certain proportion of $SiO_2$ from the abrasion of the grinding media is obtained.

Production of a Green Body and of an $SiO_2$ Molded Body

The homogenized stable slurry 6b is poured, with application of pressure, into a plastic mold which has a liquid-tight cylinder jacket and a porous base plate made of plastic. The base plate is adjacent to a drainage system on which additional negative pressure can be applied to accelerate dewatering. In the plastic mold, the homogenized stable slurry 6b is dewatered to form a porous cylindrical green body 7 having an outer diameter of 100 mm. Several green bodies 7 having cylinder heights in the range from 50 to 100 mm are produced experimentally.

To remove bound water, the green body 7 is dried in a ventilated oven at approximately 60° C. for two days and, after cooling, contaminated surface regions of the still porous green body 7 are ground off. In the case of the grinding disks used, the grinding media are fixed in a plastic binding. The removed ground amount is approximately 0.5 mm at the cylinder jacket surface and approximately 5 mm on the end faces.

For sintering the green body 7, the green body is heated in a sintering furnace under air with a heating ramp of 2°

C./min to a heating temperature of 1375° C. (or in the case of one measurement sample, to 1400° C.) and kept at this temperature for 4.5 h. Cooling takes place with a cooling ramp of 2° C./min to a furnace temperature of 1000° C. and then unregulated, with the furnace closed. A quartz glass cylinder 8 having a diameter of 90 mm is obtained. The cylinder height is in the range of approximately 45 to 90 mm depending on the initial height of the green body 7.

Table 1 summarizes, for measurement samples A to G and the comparative samples H and J, the composition, the solids content in the slurry at the time of casting into the casting mold, and the time of the addition of $SiO_2$ nanoparticles and optionally the sintering temperature.

TABLE 1

| Sample | Solids content during the casting process (wt %) | Proportion of nanoparticles BEFORE [wt %] | Proportion of nanoparticles AFTER [wt %] | Sintering temperature [° C.] |
|---|---|---|---|---|
| A | 77-79.5 | 1 | 0 | 1375 |
| C | 77-79.5 | 5 | 0 | 1375 |
| D | 77-79.5 | 10 | 0 | 1375 |
| E | 77-79.5 | 10 | 0 | 1400 |
| F | 77-79.5 | 0 | 0 | 1375 |
| G | 77-79.5 | 0 | 1 | 1375 |
| H | 75 | 5 | 0 | 1375 |
| J | 80.5 | 5 | 0 | 1375 |

Here:

BEFORE in column 2 means that the respectively indicated proportion of $SiO_2$ nanoparticles was added to the slurry before the start of the wet grinding process.

AFTER in column 3 means that the respectively indicated proportion of $SiO_2$ nanoparticles was added to the slurry after completion of the wet grinding process.

The quartz glass cylinder 8 (molded body) thus obtained consists of synthetic quartz glass, no longer open-pored, with a purity of at least 99.99 wt % of $SiO_2$ and a density of 2.15 g/cm³. The total porosity of the molded body is approximately 2.5%. The pores have maximum dimensions of less than 20 μm; on average (median value), the maximum dimensions are approximately 3 μm. The quartz glass exhibits a total impurity content of Li, Na, K, Mg, Ca, Fe, Cu, Cr, Mn, Ti, Al, Zr, and Ni of 0.2 ppm by weight. The impurities are determined by using ICP-OES or ICP-MS methods.

The quartz glass of the molded body includes:
a viscosity at 1350° C. of $6 \times 10^{10}$ dPa·s,
a modulus of elasticity of 70 GPa,
a shear modulus of 30 GPa,
flexural strength of 120 MPa,
dielectric strength of 32 kV/mm,
a specific electrical resistance of $5 \times 10^{16}$ Ωm,
relative permittivity of 3.8.

The green body obtained on the basis of the comparative sample H already exhibited visual segregation of the solid particles with a higher proportion of coarse particles in the lower region of the green body. The green body obtained from the comparative sample J exhibited casting stripes and filling structures. The effects have an impact in particular in the molded body after sintering. In the sample H, then, there were large differences in density between the top and the bottom, since the fine fractions are more sinter-active than the coarser particles. The upper part of the molded body becomes very dense and visually translucent, while the density in the lower part is comparatively low and the molded body looks opaque (white). The casting structures of the sample J also become apparent in particular on the sintered molded body, especially when it is cut into thin slices a few millimeters thick. For the measurement samples A to G of Table 1, the density distribution and the pore distribution were determined and, on the associated slurries of the measurement samples, the sedimentation behavior and the run-off times were determined.

Measurement of Density Distribution

Figure 7:
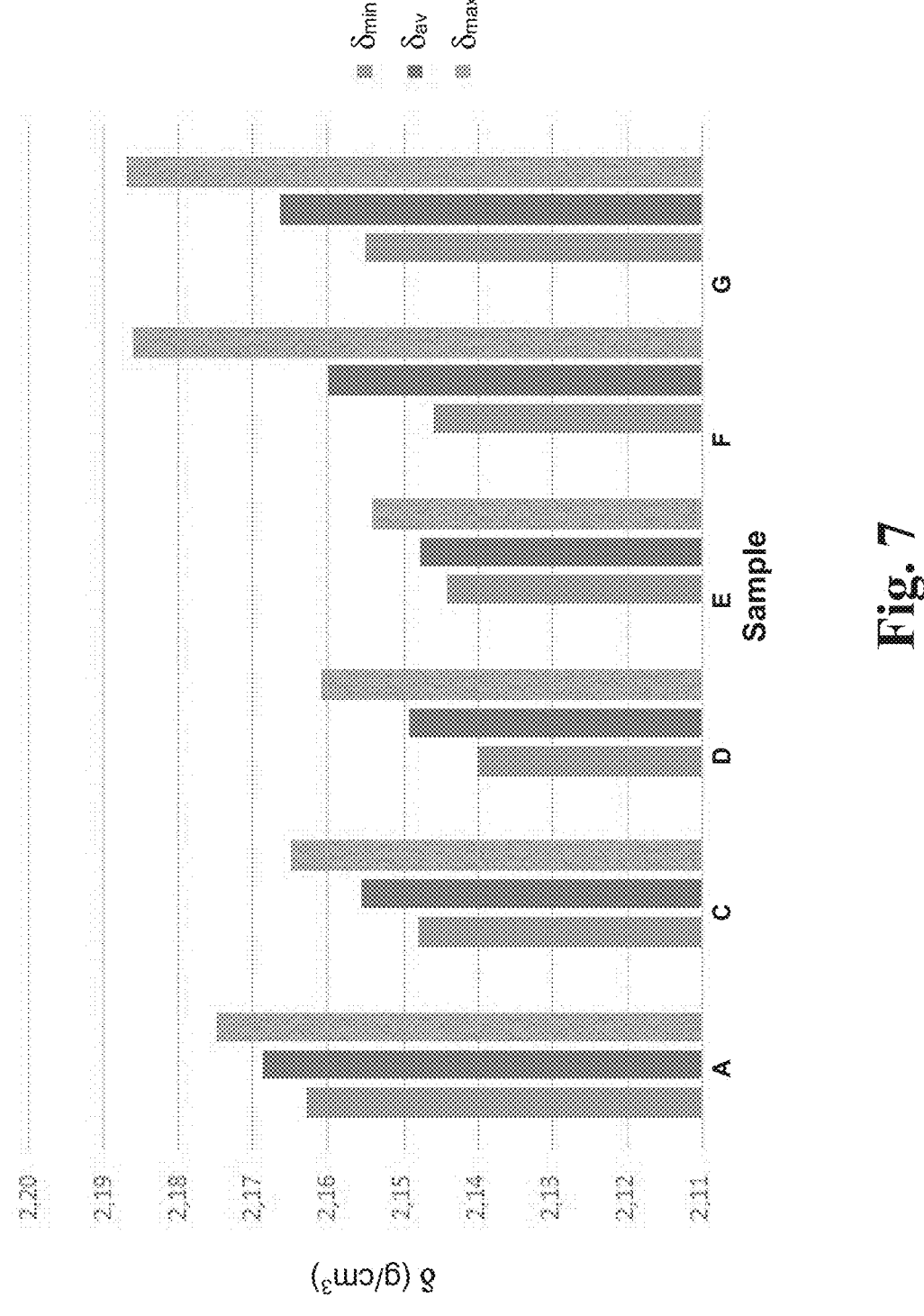
FIG. 7 is a bar chart illustrating the density of quartz glass plates produced from different slurries.

The bar graph of FIG. 7 illustrates the density values d (in g/cm³) for the measurement samples A to G for the maximum density ($d_{max}$; right bar), minimum density ($d_{min}$; left bar) and the average density (day; middle bar). The density measurement samples originate from the central longitudinal axis of the respective measurement sample, namely from the upper, central and lower volume area (based on the orientation of the green body after the casting of the slurry 6b).

Here, it can be seen that the quartz glass plates A to E, the production of which includes a wet grinding process in the presence of $SiO_2$ nanoparticles, have a comparatively small span between minimum and maximum density. The maximum span here is approximately 0.21 g/cm³ (for sample D) and the minimum span is 0.11 g/cm³ (for samples A and E). This is an indication of a high homogeneity of the molded body produced in this way. However, the quartz glass cylinders D and E, with a proportion of the $SiO_2$ nanoparticles of 10 wt % during the wet grinding process, exhibit a comparatively lower density than the samples A (1% $SiO_2$ nanoparticles in the wet grinding process) and C (5% $SiO_2$ nanoparticles).

Figure 2:
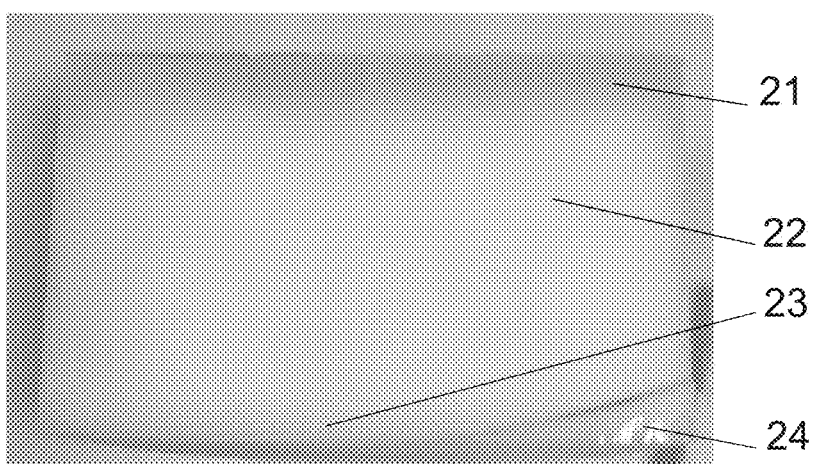
FIG. 2 is a photograph of a transverse section parallel to the longitudinal cylinder axis of a cylindrical reference sample produced according to the prior art.

The quartz glass plate F was produced without addition of $SiO_2$ nanoparticles and serves as a reference sample. For the quartz glass plate G, $SiO_2$ nanoparticles in an amount of 1 wt % were added to the homogenized slurry only after completion of the wet grinding process. The quartz glass plates F and G exhibit a large span in the density values and thus low homogeneity. FIG. 2 illustrates a cross section in the direction of the longitudinal cylinder axis of the reference sample F. Visually, the surface appears white and matte in the plate center 22 and in the region of the plate underside 23. In comparison, the quartz glass in the region of the plate top side 21 is darker in color, indicating a higher density and incipient transparency. Reference numeral 24 denotes a cutting artifact which is irrelevant here.

Measurement of the Sedimentation Tendency of the Slurry

For this purpose, 100 ml of the slurry 6b are each placed in a measuring cylinder so that the slurry forms a column with a height of 145 mm. After predetermined time intervals, the height of the supernatant above the sediment is measured using a tape measure. The height of the sediment is calculated from this.

Figure 3:
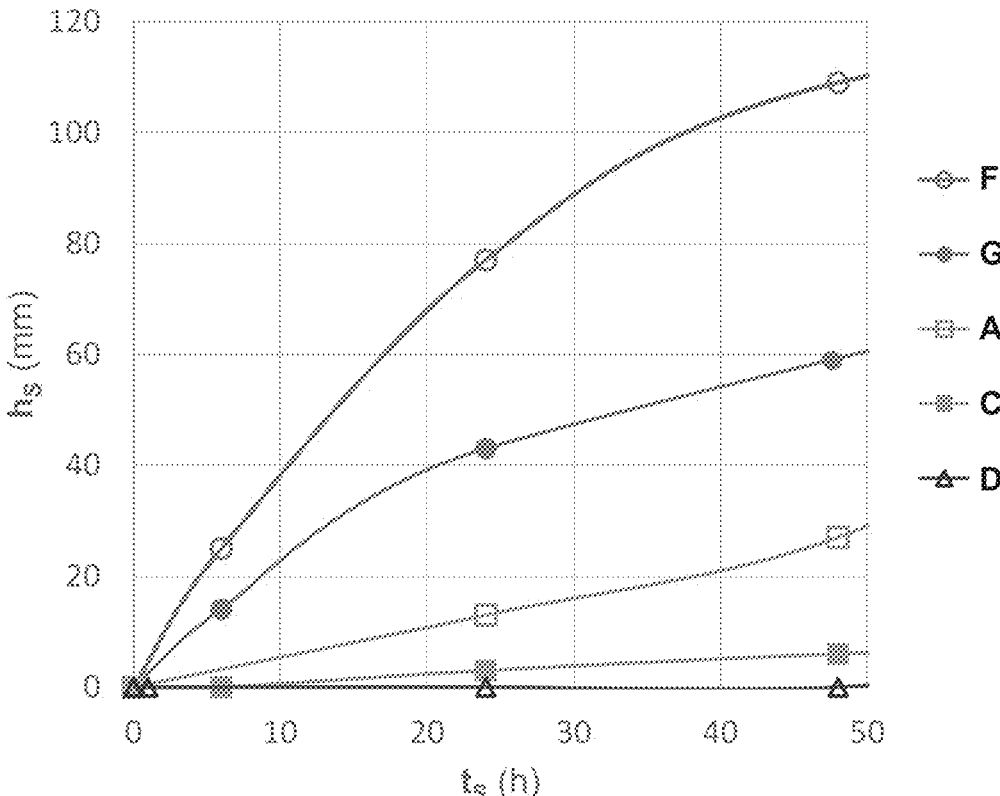
FIG. 3 is a diagram of the sedimentation course of different slurries.

The diagram of FIG. 3 illustrates the result of the sedimentation experiments of slurries with different compositions. The sediment height hs (in mm) is plotted on the y-axis and the time is (in h) after the start of the experiment is plotted on the x-axis.

It can be seen from this that the slurries in which wet grinding took place in the presence of $SiO_2$ nanoparticles (samples A, C, D) have a lower sedimentation tendency than the slurry without the addition of $SiO_2$ nanoparticles (sample F) or with subsequent addition (sample G). This effect becomes particularly noticeable in the case of measuring durations of less than three days. Table 2 lists the sedimentation heights after 24 h following the start of the experiment.

15

TABLE 2

| Sample | $h_S$ (after 24 h) [mm] |
| --- | --- |
| A | 13 |
| C | 0 |
| D | 0 |
| F | 77 |
| G | 43 |

This illustrates that the wet grinding in the presence of $SiO_2$ nanoparticles achieves a more stable slurry with a lower sedimentation tendency.

A low sedimentation tendency is also important, above all, because, depending on the filling level of the casting mold, the casting time can be several hours when casting the slurry, for example in the range from 24 h to 60 h.

Measurement of the Viscosity of the Slurry

For the qualitative measurement of the viscosity of the slurry, a run-off test was carried out. In this case, the stabilized, homogeneous slurry 6b is placed in a 165 mm single-use Eppendorf pipette tip and the time required for 10 ml of slip to run out is measured electronically by using a light barrier. The measurement is carried out three times and the average value is calculated.

Figure 4:
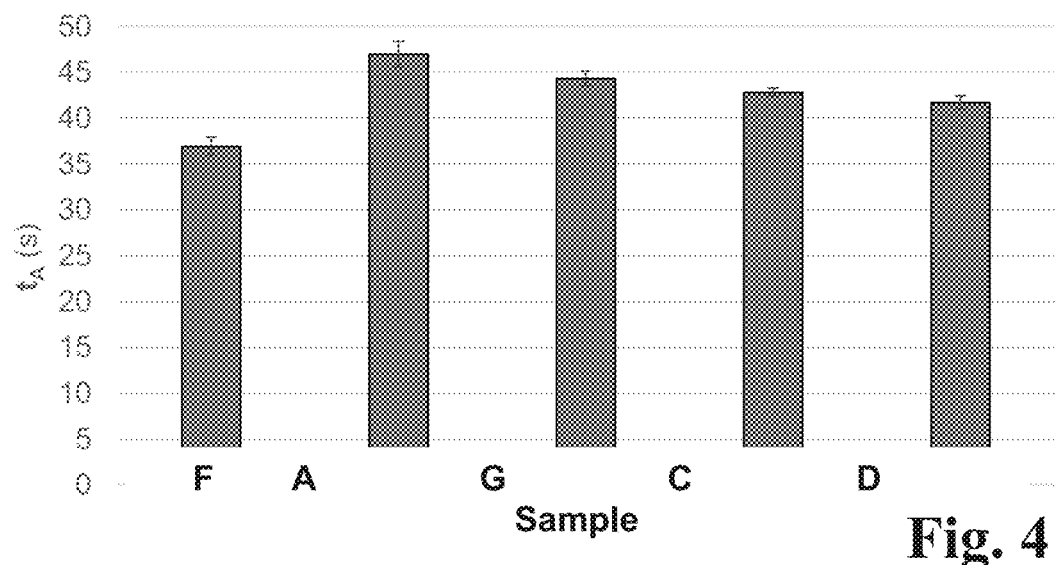
FIG. 4 is a bar chart illustrating the flowability of different slurries.

The bar graph of FIG. 4 illustrates results of these run-off experiments for slurries of different composition. The run-off time $t_A$ (in s) is plotted on the y-axis.

It can be seen from this that slurries in which wet grinding took place in the presence of $SiO_2$ nanoparticles (samples A, C, D) have a longer run-off time and accordingly a higher viscosity than the slurry without the addition of $SiO_2$ nanoparticles (sample F).

Measurement of the Pore Size Distribution

Figure 5:
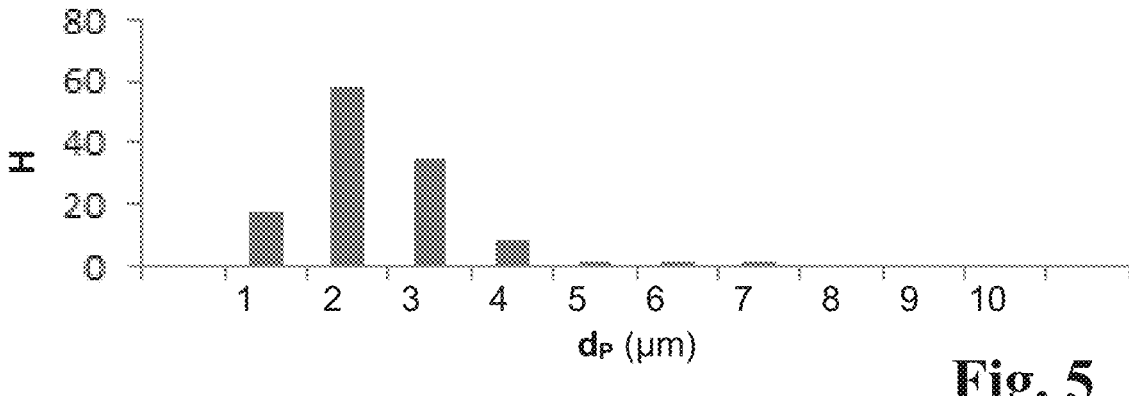
FIG. 5 is a bar chart illustrating the pore size distribution of a molded body according to one embodiment.

The histogram of FIG. 5 illustrates the result of a measurement of the distribution of the pore sizes (pore diameters) in the measurement sample A (with addition of 1 wt % of $SiO_2$ nanoparticles during the wet grinding process). The number H (frequency) is indicated on the y-axis and the pore size $d_P$ (in μm) on the x-axis, with rounding to the full micrometer digit. The maximum distribution is for pore sizes of between 1 and 2 μm. Pores with pore sizes of 7 μm and greater are not present.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method for producing a molded body made of opaque quartz glass, comprising:
(a) providing $SiO_2$ grains obtained by comminuting quartz glass having a purity of at least 99.9 wt % $SiO_2$,
(b) forming a slurry which contains a suspension liquid and the $SiO_2$ grains and which has a total solids content,
(c) wet grinding the $SiO_2$ grains in the slurry so as to form ground $SiO_2$ grain particles,
(d) forming a porous green body from the slurry comprising a process step in which the slurry is poured into a dewatering mold, and

(e) sintering the porous green body so as to form the molded body of opaque quartz glass,
wherein the wet grinding of the $SiO_2$ grains according to (c) takes place, at least part of the time or during the entire step of wet grinding, in the presence of $SiO_2$ nanoparticles, the proportion of which in the total solids content of the slurry is in the range of 0.1 wt % to 10 wt %, and in that the slurry has a solids content in the range of 76 to 79.5 wt % after addition of the $SiO_2$ nanoparticles and after the wet grinding, and wherein at least a portion of the $SiO_2$ nanoparticles of the slurry are added in colloidal form into a dispersion with a specific surface area (BET) of at least 20 $m^2/g$, and wherein the molded body has a homogeneity defined by a difference in density between a maximum density and a minimum density of less than 0.026 $g/cm^3$.

2. The method according to claim 1, wherein the proportion of $SiO_2$ nanoparticles in the total solids content is in the range of 1 wt %-5 wt %.

3. The method according to claim 1, wherein the wet grinding of the $SiO_2$ grains according to (c) in the presence of $SiO_2$ nanoparticles is at least 1 hour.

4. The method according to claim 1, wherein the wet grinding of the $SiO_2$ grains according to (c) in the presence of $SiO_2$ nanoparticles is at least 120 hours.

5. The method according to claim 1, wherein the slurry is cooled, after the wet grinding, under movement, for at least 1 hour.

6. The method according to claim 1, wherein the slurry is cooled, after the wet grinding, under movement for at least 30 hours.

7. The method according to claim 1, wherein, after the wet grinding, the slurry has $SiO_2$ particles having a particle size distribution which is defined by a $D_{90}$ of less than 50 μm and a $D_{50}$ value of less than 15 μm.

8. The method according to claim 1, wherein, after addition of the $SiO_2$ nanoparticles and after wet grinding, the slurry has a pH in the range of 3 to 5 and a solids content in the range of 77 to 79.5 wt %.

9. The method according to claim 1, wherein the slurry has a sedimentation behavior which is characterized in that a column of the slurry having a height of 145 mm has formed a sediment with a sediment height of less than 20 mm after a standing time of 24 hours.

10. The method according to claim 1, wherein the $SiO_2$ grains are obtained by comminuting synthetically produced transparent quartz glass, wherein the comminuting comprises electrodynamic and/or electrohydraulic fragmentation of the transparent quartz glass.

11. The method according to claim 1, wherein the green body is dried before sintering, wherein the drying is carried out at above room temperature and comprises a drying duration of at least 24 hours.

12. The method according to claim 1, wherein a surface region of the green body is removed before sintering by mechanical machining, by sanding, wherein a machining tool is used that has machining surfaces made of plastic-bonded grains.

13. The method according to claim 1, wherein the sintering in accordance with method step (e) takes place at a sintering temperature in the range between 1325° C. and 1600° C.

14. The method according to claim 1, wherein the sintering in accordance with (e) takes place at a sintering temperature at 1450° C.

* * * * *